EDWARD G. KELLEY & A. H. TAIT.

Improvement in Processes and Apparatus for Distilling, Separating, and Purifying Petroleum.

No. 4,375. Reissued May 9, 1871.

*Witnesses:*

Dr. H. Ellsworth.

E. A. Ellsworth.

*Inventors.*

E. G. Kelley

A. H. Tait per

Van Santvoord & Hopf

Attys

United States Patent Office.

EDWARD G. KELLEY, OF NEW YORK, N. Y., AND AUGUSTUS H. TAIT, OF JERSEY CITY, NEW JERSEY, ASSIGNORS, BY MESNE ASSIGNMENTS, TO CHARLES PRATT, OF NEW YORK CITY.

Letters Patent No. 32,568, dated June 18, 1861; reissue No. 4,375, dated May 9, 1871.

IMPROVEMENT IN PROCESSES AND APPARATUS FOR DISTILLING, SEPARATING, AND PURIFYING PETROLEUM.

The Schedule referred to in these Letters Patent and making part of the same.

*To all whom it may concern:*

Be it known that we, EDWARD G. KELLEY, of the city, county, and State of New York, and AUGUSTUS H. TAIT, of Jersey City, in the county of Hudson and State of New Jersey, have invented a new and improved Process and Apparatus for Distilling, Separating, and Purifying Petroleum; and we do hereby declare the following to be a full, clear, and exact description of the same, reference being had to the accompanying drawing forming part of this specification, in which—

Similar letters of reference in the accompanying drawing indicate corresponding parts in the several figures.

Figure 1:
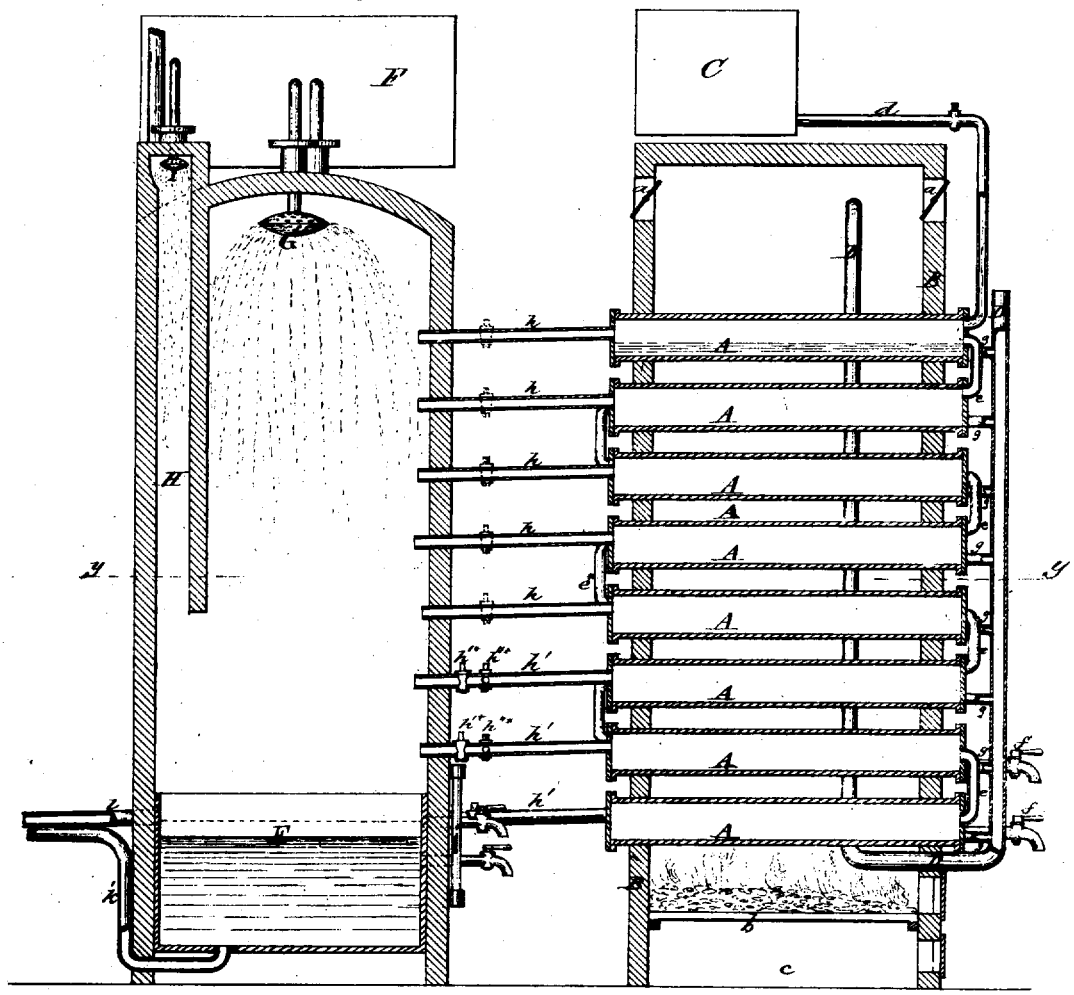
Figure 1 is a longitudinal vertical section of our invention, the line *x x*, fig. 2, indicating the plane of section.
Figure 2:
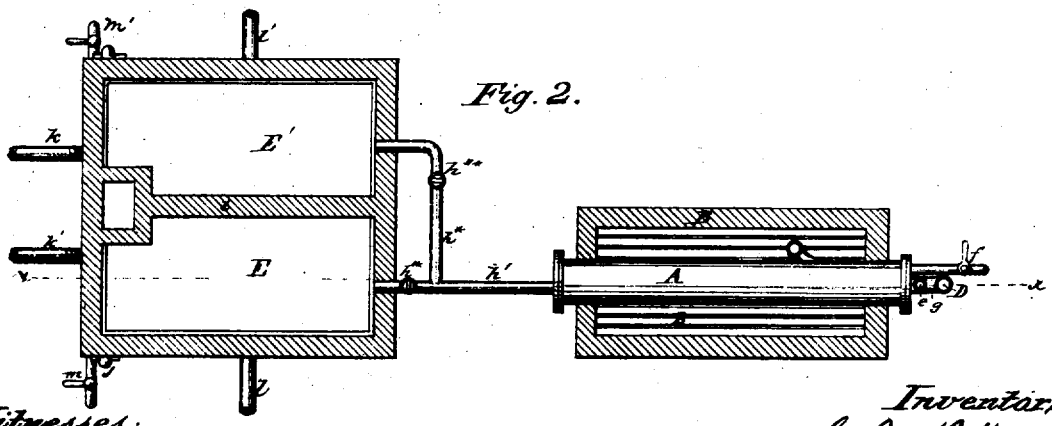
Figure 2 is a horizontal section of the same in the plane indicated by the line *y y*, fig. 1.

The object of this invention is to distil and purify petroleum so as to separate its different products; and The invention consists as follows:

A series of retorts are arranged in a furnace and connected together at opposite ends, so that, as the petroleum is fed in it will flow through from retort to retort, entering that which is least heated and finally reaching that most heated.

The goose-necks or discharge-pipes for the vapor are arranged as low as possible, so that the vapors generated pass easily to the condensers.

The condenser is composed of one, two, or more chambers, having pipes connected therewith, so that water or other cold liquid may be injected, in the form of spray, shower, or mist, into the vapors of petroleum in the condensing-chambers and condense them.

In the bottom of the condensing-chambers are arranged draw-off pipes in the form of traps, the one for the water and the other for the oil which will float upon the water.

The vessel for containing the crude petroleum to be distilled is arranged above the upper retort so that the oil may be fed to the retorts continuously.

To assist in vaporizing the oil in the retorts we connect with each retort a pipe for introducing superheated steam. This has the effect to vaporize the oil, especially the more volatile portions in the first retorts. It also regulates the temperature in the retorts, preventing excessive heat and burning.

The steam also serves to draw off the oil-vapors as soon as formed, and prevents decomposition, which is liable to ensue when oil-vapors are left in contact with hot metallic surfaces.

The mingling of steam with the oil-vapors assists also in washing and purifying the oil when condensed with them by the spray or shower in the condensers.

Although we prefer to use the steam-jet in connection with fire-heat, either might be used alone.

The steam may be conveniently superheated by passing it through a superheating pipe in the furnace which heats the retorts.

To enable others skilled in the art to make and use our invention, we will now proceed to describe its construction and operation with reference to the drawing.

One or more retorts, A, of cast-iron, clay, or any other suitable material, are arranged in the interior of the furnace B, built of brick, sufficiently high to admit, if desired, of eight, more or less, retorts, one above the other, and so constructed that it also serves as a chimney.

Two or more dampers, *a*, at or near its upper extremity, serve to regulate the draught of the fire, and a grate, *b*, with an ash-box, *c*, completes the furnace.

A tank, C, on the top of the furnace, and supported by suitable braces, receives the crude oil, and a pipe, *d*, forms the communication between this tank and the uppermost retort.

The several retorts communicate with each other by means of overflow-pipes *e*, so arranged that a continuous flow of the oil downward is effected, and a regular depth maintained in each retort.

The lowest retort or retorts are furnished with discharge-cocks *f*.

The oil in the retorts is mixed with superheated steam that is introduced through a pipe, D, connected with a steam-boiler, and which enters the furnace at or near its top, and, after passing down through the entire height of the same, comes out at or near its bottom, whence it bends upward, communicating with the several retorts through branch pipes *g*, as clearly shown in the drawing.

In passing down through the interior of the furnace the steam is superheated, and, as it reaches the several retorts, it causes the oil contained it the same to vaporize, and it readily mixes with the vapors of the oil and passes off with them, through the pipes *h h*, into the condensing-chamber or chambers E E', the vaporization of the oil being further facilitated by the direct action of the fire in the furnace.

The condensers and chambers, which, like the furnace, are built of brick or of any suitable material, are separated from each other by a partition, *i*, and they are used, one to condense the light and the other the heavy oils.

To effect the separation of the oils the pipes *h*, which conduct the vapors from the lower retorts to the condensing-chambers, are provided with branch-pipes *h** and stop-cocks *h'* and *h"**, so that, by shutting the cocks *h'** and opening the cocks *h"** the vapors from these retorts pass into the condensing-chamber E'.

The condensation is effected by jets of water introduced from a tank, F, through roses G, into the chambers E E'. As the cold water comes in contact with the vapors of the oil the latter are condensed, and the condensed water and oil, together with the condensing-water, accumulate on the bottom of the chambers E E, the water below and the oil on its surface, the quantity of oil and water contained in said chambers being indicated by glass gauges, *j j*, that are inserted into the sides of the chambers.

The non-condensible or very volatile gases contained in the vapors of the oil and steam pass off through the pipe H, and a rose, I, which allows of throwing cold water into said chimney, serves to condense such condensible vapors which may be yet mixed with the gases passing off through the chimney.

The water which accumulates at the bottom of the chambers E E' runs off through the overflow-pipes *k k'*, and the oil through the pipes *l l'*, with faucets *m m'*, to draw off the light oil from one and the heavy oil from the other chamber.

These pipes are arranged so as to form a trap, which prevents any vapors from escaping.

The principal advantages of this apparatus are derived, in the first place, from the manner of arranging the retorts in the furnace one above the other, and from the connecting overflow-pipes, whereby the oil is gradually heated as it descends from the highest to the lowest retort, and an explosion is rendered almost impossible.

Furthermore, by the introduction of superheated steam the evaporation is facilitated, and the vapor of the oil is made to pass readily with the steam into the condensing-chambers, and, as the vapor of the oil is brought in direct contact with the condensing water and condensed simultaneously with the steam, a partial vacuum is produced in the still or stills and the miasms or atoms, which are the cause of the disagreeable smell of the oil, are precipitated with the water, and the oil is refined and deodorized in one operation.

Besides this, the light and the heavy oils can be separated from each other by the aid of my apparatus in a very convenient and expeditious manner.

In some cases it may be desirable to rectify the oil without the aid of steam, and in such cases the pipes *e** are used, in combination with the connecting-pipes *e*, to cause the vapors from all the retorts to pass up to the highest retort, from which the whole mass of vapors is conducted to the condensing-chamber or chambers.

In this case—that is, when it is desired to use the pipes *e e** for the purpose of returning the vapors to the highest retort—all the pipes *h' h*, with the exception of that pipe which connects the highest retort with the condensing-chamber, have to be closed by suitable stop-cocks, as indicated by outlines in fig. 1 of the drawing.

By stopping these pipes the vapors are compelled to pass up through the pipes *e e**, while at the same time the oil drips down through the pipes *e*.

The sudden condensation of the oil-vapors in chambers E E' by the spray of cold liquid will always keep a slight vacuum in vessels E E', and thereby the vapors generated in the retorts are rapidly drawn off as fast as generated, and decomposition thereby prevented, since all pressure in the retorts is relieved.

The oil distilled in this manner is therefore more easily deodorized.

The mingling of steam with the oil-vapors and the condensation of these vapors by means of water in direct contact with them washes out any disagreeable odor that might be formed in the retorts.

As the oil is gradually heated and is constantly flowing through the retorts, there is little danger of overheating or producing destructive distillation.

Besides, the mingling of steam with the oil-vapors carries them off and prevents any excessive temperature.

The oil in each retort is vaporized at the lowest temperature at which it is capable of being distilled.

All the more volatile parts of the petroleum will be drawn off in the cooler retorts, and only the last retorts will be subjected to a high temperature.

We prefer to superheat the steam used in the same furnace employed for distilling.

We do not claim, broadly, the condensation of vapors by injecting water, as that is well known in the condensers of steam-engines, coal-gas retorts, and the like.

Our invention is designed for the distillation, separation, and purification of petroleum, in which it effects important results not attainable by the methods and apparatus heretofore in use.

We do not claim, broadly, the use of steam or of superheated steam in vaporizing hydrocarbon-oils, as that is well known.

But it will be seen that our method of applying steam accomplishes new results, and that by means of it, together with the process of continuous distillation, as herein described, a more perfect separation of the valuable parts of petroleum is effected than by the old method of distilling pretroleum in bulk, in which, at the beginning of the operation, the oil is liable to boil over, and toward the end become so highly heated as to decompose and thereby injure the still or retort.

Having thus described our invention,

What we claim as new is—

1. The process herein described for distilling hydrocarbon-oils, consisting in flowing the oil in a stream through a series of retorts arranged so that the oil enters the retort in the cooler part of the furnace and is subjected to an increasing temperature as it flows, so that vapors of different densities are successively removed, as set forth.

2. The use in a retort or still for distilling hydrocarbons, of steam or superheated steam in connection with fire, so as to assist in heating the oil and removing the vapors as formed.

3. The method herein described for condensing the vapors of petroleum, consisting in injecting into them water or equivalent cold liquid in the form of spray or shower, substantially as described.

4. A series of retorts or stills arranged in a furnace and connected together, so that oil may be distilled continuously by being fed into the retort or still in the colder part of the furnace, and flowing successively through the retorts in the hotter portions of the furnace, and thereby separating the different portions of oil according to the temperature at which they become vapor.

5. The arrangement of pipes and traps, whereby oil and water are automatically separated and removed from the condenser, substantially as set forth.

6. A series of retorts or stills, A, connected together at alternate ends, in combination with a series of draw-off pipes, *h*, so that the vapor generated in each still is immmediately drawn off, as set forth.

7. A condenser for oil-vapor, composed of chamber E, in combination with spray-pipe G, or its equivalent, so as to operate substantially as set forth.

8. The process herein described for purifying petroleum, consisting in mingling steam with the oily vapors, and condensing them by a jet or spray of water, thereby washing out any offensive odor, as set forth.

9. The combination of one or more stills or retorts, A, steam-pipe D, and one or more condensing-chambers, E E', substantially as set forth.

10. The arrangement of the pipe $e^*$, in combination with the range of stills or retorts A, and connecting-pipe, substantially as described.

11. A jet or condenser for treating the vapors which pass off with the non-condensible gases, for the purpose specified.

This specification signed by us this 8th day of April, 1871.

EDWARD G. KELLEY.
A. H. TAIT.

Witnesses:
W. HAUFF,
E. A. ELLSWORTH.